US008214977B2

(12) United States Patent
Szor (10) Patent No.: US 8,214,977 B2
(45) Date of Patent: Jul. 10, 2012

(54) CENTRALIZED SCANNER DATABASE WITH OPTIMAL DEFINITION DISTRIBUTION USING NETWORK QUERIES

(75) Inventor: Peter Szor, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 969 days.

(21) Appl. No.: 12/124,458

(22) Filed: May 21, 2008

(65) Prior Publication Data

US 2009/0293125 A1 Nov. 26, 2009

(51) Int. Cl.
*H04L 29/06* (2006.01)
(52) U.S. Cl. ............................. 26/24; 713/188
(58) Field of Classification Search .............. 726/22–27; 713/165, 187, 188
See application file for complete search history.

(56) References Cited

U.S. PATENT DOCUMENTS

| 5,960,170 | A | 9/1999 | Chen et al. | |
|---|---|---|---|---|
| 6,347,375 | B1 * | 2/2002 | Reinert et al. | 726/24 |
| 6,976,271 | B1 | 12/2005 | Le Pennec et al. | |
| 7,093,293 | B1 * | 8/2006 | Smithson et al. | 726/24 |
| 7,401,359 | B2 * | 7/2008 | Gartside et al. | 726/22 |
| 7,523,502 | B1 * | 4/2009 | Kennedy et al. | 726/24 |
| 2005/0086520 | A1 | 4/2005 | Dharmapurikar et al. | |
| 2005/0198076 | A1 * | 9/2005 | Stata et al. | 707/200 |
| 2006/0174345 | A1 | 8/2006 | Flanagan et al. | |
| 2007/0240218 | A1 | 10/2007 | Tuvell et al. | |
| 2008/0140662 | A1 * | 6/2008 | Pandya | 707/6 |
| 2008/0155264 | A1 | 6/2008 | Brown et al. | |
| 2009/0064335 | A1 * | 3/2009 | Sinn et al. | 726/24 |
| 2009/0305687 | A1 * | 12/2009 | Baldan | 455/419 |
| 2010/0031358 | A1 * | 2/2010 | Elovici et al. | 726/24 |
| 2010/0205265 | A1 * | 8/2010 | Milliken et al. | 726/24 |

OTHER PUBLICATIONS

Cho, Y.H. et al., "Programmable Hardware for Deep Packet Filtering on a Large Signature Set," Workshop on Architectural Support for Security and Anti-Virus '04 Boston, MA, USA, Oct. 2004, 9 pages.
Dharmapurikar, S. et al., "Design and Implementation of a String Matching System for Network Intrusion Detection Using FPGA-Based Bloom Filters," Science and Engineering: Technical Report WUCS-2004-012, 2004, pp. 1-10, [online] Retrieved from the Internet<URL:http://www.arl.wustl.edu/~lockwood/publications/WUCS_2004_012-FPGA_Bloom_String.pdf>.
Erdogan, O. et al., "Hash-AV: Fast Virus Signature Scanning by Cache-Resident Filters," International Journal of Security and Networks, 2007, pp. 50-59, vol. 2, No. 1-2.
PCT International Search Report and Written Opinion, PCT Application No. PCT/US2009/044713, Sep. 9, 2009, 12 pages.

* cited by examiner

*Primary Examiner* — Gilberto Barron, Jr.
*Assistant Examiner* — Abdulhakim Nobahar
(74) *Attorney, Agent, or Firm* — Fenwick & West LLP (57) ABSTRACT

A system and method detects malware on client devices based on partially distributed malware definitions from a central server. A server stores malware definitions for known malware. The server generates one or more filters based on the malware definitions and distributes the filter(s) to client devices. The server also distributes full definitions to the clients for a subset of the most commonly detected malware. The client device scans files for malware by first applying the filter to a file. If the filter outputs a positive detection, the client scans the file using the full definition to determine if the file comprises malware. If the full definition is not stored locally by the client, the client queries the server for the definition and then continues the scanning process.

20 Claims, 6 Drawing Sheets

CENTRALIZED SCANNER DATABASE WITH OPTIMAL DEFINITION DISTRIBUTION USING NETWORK QUERIES

BACKGROUND

1. Field of Art

The disclosure generally relates to computer security, and more specifically to detecting malware.

2. Description of the Related Art

Malware such as computer viruses, worms, Trojan horses, and spyware pose a constant threat to modern computer systems. In order to combat malicious files, computer systems typically run antivirus software that attempts to detect, identify, and remove the malicious files. Conventional antivirus software stores a database of definitions with each definition corresponding to known malware. The antivirus software periodically scans files on the client machine to detect malware matching the stored definitions. The detected malware can then be neutralized or eliminated.

While anti-virus programs are able to detect and remove malware, new malware designed to work around existing programs is constantly being produced. Thus, it is important to frequently update these antivirus definitions so that newly released malware can be detected. These updates are typically provided by vendors of the antivirus programs.

In recent years, the number of new known malware has increased dramatically, making the distribution of updates an increasingly challenging problem. The frequent updates can create data overload problems for client machines that must constantly receive and store new definitions while continuing to store and maintain all of the older definitions. This is particularly problematic for client machines with limited physical memory such as, for example, Automated Teller Machines (ATMs), or for machines with limited network bandwidth. Furthermore, distributing large numbers of definitions to client machines results in significant costs to the definition distributers.

One approach to this problem is to reduce the number of active definitions used by the antivirus software by eliminating older definitions that are no longer deemed to pose a continuous threat. However, this approach leaves the client vulnerable to attack should these older threats reappear. Another conventional approach is to provide a central antivirus server to store all of the definitions rather than distributing the definitions to local machines. However, while this approach reduces local storage requirements, it significantly increases network traffic between the client and server and does not provide significant improvement in overall performance and cost. Therefore, what is needed is an improved system for distributing malware definitions to client devices.

SUMMARY

A system, method, and computer program product detect malware. In a client device, a scanning engine applies a filter to an input file to determine if the input file has characteristics matching a malware definition in a set of known malware definitions. Responsive to determining that the input file has matching characteristics based on the filter, the file is scanned using the definition for the known malware. The scanning engine determines if the input file comprises malware based on the scanning.

A central server generates the filter based on the set of known malware definitions and distributes the filter to the client. The central server also determines definitions to distribute to the clients for a subset of the known malware definitions. In one embodiment, when scanning the file, the scanning engine determines if the definition is stored locally. If the definition is not stored locally, the client requests the definition from the server and the server transmits the definition to the client.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1:
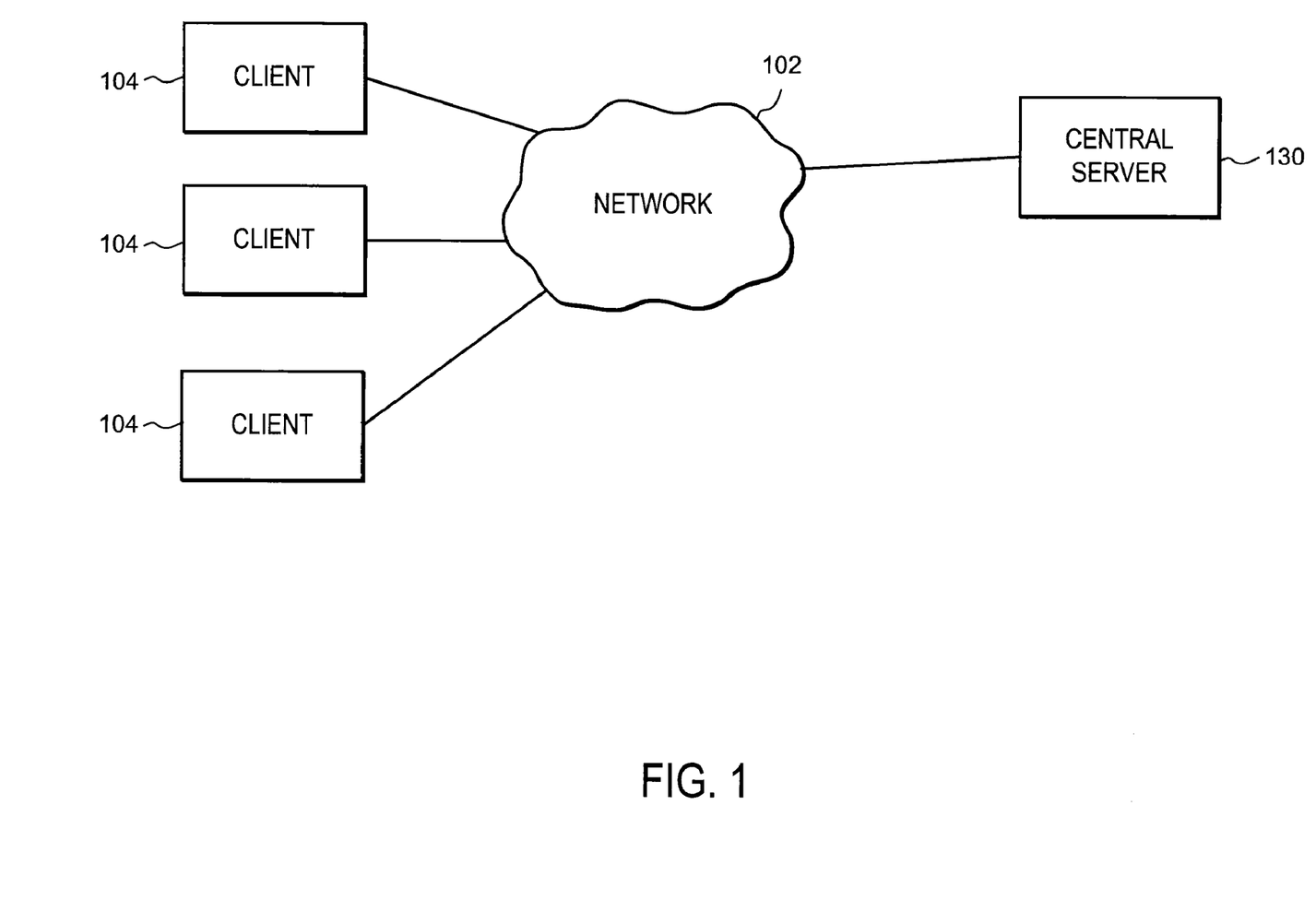
FIG. 1 is a high-level block diagram of a computing environment according to one embodiment.

FIG. 1 is a high-level block diagram of a computing environment 100 according to one embodiment. The computing environment 100 comprises a central server 130 and clients 104 all connected by a network 102. Only three clients 104 are shown in FIG. 1 in order to simplify the description. Embodiments of the computing environment 100 can have many more clients 104 connected to the network 102.

In one embodiment, a client 104 is a computer used by one or more users to perform activities including downloading, installing, executing files, and/or browsing web sites accessible via the network 102. In other embodiments, the client 104 is a network-capable device other than a computer, such as a personal digital assistant (PDA), a mobile telephone, a pager, a television "set-top box," etc. Clients 104 may be vulnerable to attack from malware such as viruses, worms, Trojan horses, spyware, etc. and typically run antivirus software in order to detect, remove, and/or block the malware. An embodiment of a computer system for use as a client 104 is described in more detail below with reference to FIG. 3.

The network 102 represents the communication pathways between the clients 104 and the central server 130. In one embodiment, the network 102 is the Internet. The network 102 can also utilize dedicated or private communications links that are not necessarily part of the Internet. In one embodiment, the network 102 uses standard communications technologies and/or protocols. Thus, the network 102 can include links using technologies such as Ethernet, 802.11, integrated services digital network (ISDN), digital subscriber line (DSL), asynchronous transfer mode (ATM), etc. Similarly, the networking protocols used on the network 102 can include the transmission control protocol/Internet protocol (TCP/IP), the hypertext transport protocol (HTTP), the simple mail transfer protocol (SMTP), the file transfer protocol (FTP), etc. The data exchanged over the network 102 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The central server 130 can include one or more standard computer systems such as the computer system of FIG. 3 described below. The central server 130 communicates with the clients 104 via the network 102 to distribute antivirus updates to the clients 104. In one embodiment, the central server 130 is accessible via the Internet and is maintained by a third party provider. Alternatively, the central server 130 may be maintained by an administrator of a local enterprise network. For example, within a business enterprise, a business may maintain its own central server 130 to distribute updates to all of its clients 104 without relying on an external service.

The central server 130 may periodically distributes updated malware definitions to the clients 104. Alternatively, the clients 104 may query the central server 130 for one or more specific definitions when a potential threat is suspected and the definition is not available locally. In one embodiment, rather than distribute full malware definitions to each of the clients 104, the central server 130 instead distributes one or more filters. The filter(s) are generated from the malware definitions and used to determine if an input file being scanned has characteristics matching those of the known malware definitions. During scanning, the client 104 applies a filter to the file being scanned and the filter outputs either a positive or negative detection. In one embodiment, the filter is designed such that false positive detections may occasionally occur, but false negative detections never occur. For example, in some instances the filter may incorrectly output a positive detection of malware when no malware is actually present in the files being filtered. However, the filter will never incorrectly output a negative detection when malware is present, so long as the malware definition is included in the known set used to generate the filter. Advantageously, the filter comprises significantly less data than the full definitions and therefore reduces storage and bandwidth requirements for the clients 104.

In addition to generating and distributing the one or more filters, the central server 130 stores a set of full definitions for all known malware. During scanning, if the applied filter detects potential malware, the client 104 may query the central server 130 to retrieve the full definition. The client 104 then scans the file using the full definition to determine if the filter result was a true positive (i.e. the filtered file actually comprises malware) or a false positive (i.e. the filtered file does not actually comprise malware). In one embodiment, the central server 130 also distributes full definitions to the clients 104 for a subset of known malware definitions. For example, the central server may distribute definitions for the malware deemed to pose the most serious threat (e.g., definitions for the most common 30% of malware). This way, full definitions for the malware most likely to be detected can be retrieved locally, reducing network traffic.

Figure 2:
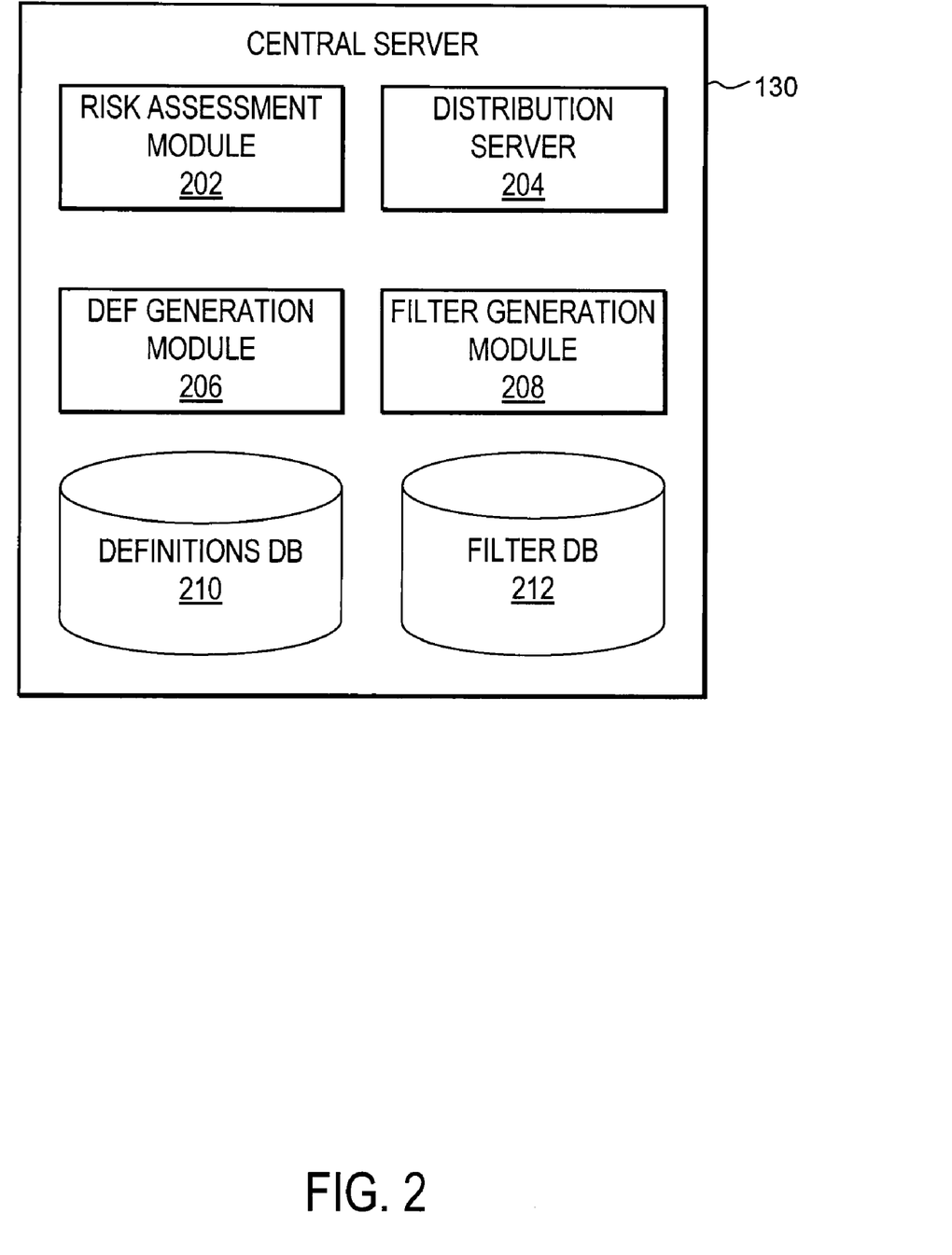
FIG. 2 is a block diagram of a central server according to one embodiment.

FIG. 2 illustrates an example embodiment of the central server 130. The central server 130 includes a risk assessment module 202, a distribution server 204, a definition generation module 206, a filter generation module 208, a definitions database 210, and a filter database 212. The definitions generation module 206 generates full definitions for known malware whenever new malware is discovered. In one embodiment, the full definition includes one or more signatures comprising a characteristic byte pattern known to be present in the malware. Alternatively, the definition can include a heuristic that detects malware based on common behavior. Definitions are typically generated based on input from security analysts that examine and analyze instances of the malware. Once generated, the full definitions are stored in the definitions database 210.

The risk assessment module 202 assesses the relative risk of each known malware threat and determines a subset of definitions to distribute to the clients 104. The remaining definitions are stored only at the central server 130. The assessment module 202 may execute periodically to reassess risk and distribute updated definition sets accordingly. In one embodiment, the risk assessment module 202 collects data from the client devices 104 and uses this information to determine the relative risk of malware. For example, the risk assessment module 502 may monitor the number of queries received by the central server 130 for a particular definition. If the central server 130 is queried at a high frequency for a particular definition, the risk assessment module 202 may determine that the definition should be distributed to the clients 104. By distributing the most common definitions, network traffic between the central server 130 and the clients 104 can be reduced.

The filter generation module 208 generates the one or more filters based on the malware definitions and stores the filter(s) in the filter database 212. In one embodiment, the filter generation module 208 generates one or more Bloom filters from the set of malware definitions. A Bloom filter is a type of filter used to determine if an element is a member of a set (e.g., the set of known malware files). To generate the Bloom filter, the filter generation module 208 begins with an empty array of bit values. A number of hashes are computed on each known malware definition with the output of each hash function providing a pointer to a position in the bit array. Each of these positions outputted by the hash functions is then set to 1 while the remaining positions are set to 0. Many examples of hash functions that can be used are known to those of ordinary skill in the art.

To apply the filter, the same set of hash functions are applied to an input file and a number of pointers to positions in the array are returned. If each of these positions has a bit value of 1, then the filter outputs a positive detection indicating that the input file has characteristics matching a definition in the set of known malware definitions. Furthermore, the filter can determine the identity of the matching malware based on the combination of array positions outputted by the hash functions. If any of the positions are 0, then the input file is not in the set (i.e. negative detection). A characteristic of the Bloom filter is that false positives are possible for a small percentage of cases, but the filter never returns a false negative.

This type of filter can advantageously be implemented by distributing only a very small amount of data (the bit array values) to the clients 104 rather than distributing the full definitions. In some embodiments, the filter generation module 208 may generate multiple filters for different subgroups of definitions. By increasing the number of filters, the percentage of false positives can be reduced at the expense of distributing more filter data to the clients 104.

The distribution server 204 communicates with the network 102 to distribute the filter(s) stored in the filter database 212 to the clients 104. The distribution server 204 may also distribute a subset of the definitions stored in the definitions database 210 to clients 104. For example, the distribution server 204 may distribute a percentage of the definitions that are most likely to be detected. In addition, the distribution server 204 can provide requested definitions to the client 104 when the server 130 is queried for a particular definition not stored locally by the client 104.

Figure 3:
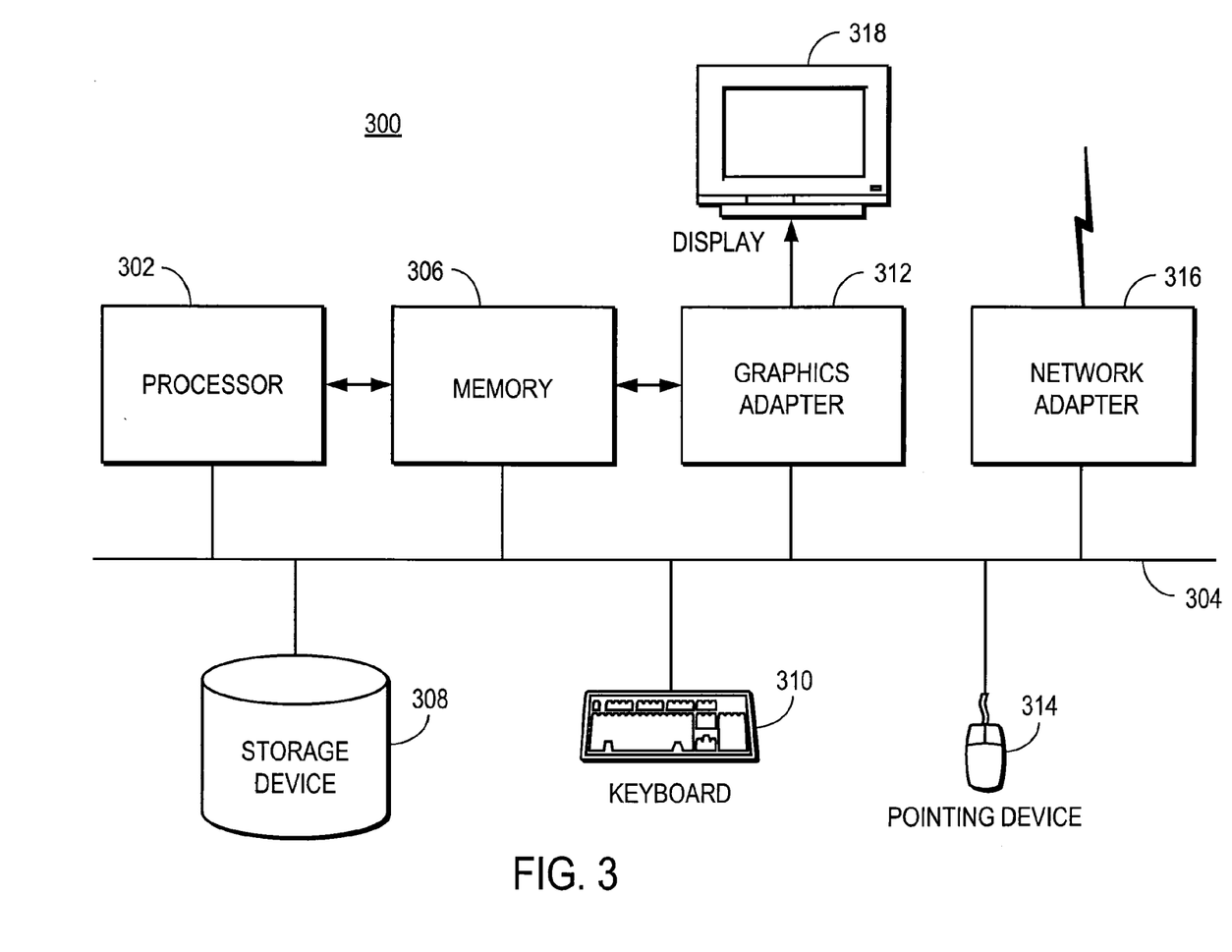
FIG. 3 is a high-level block diagram illustrating a typical computer system according to one embodiment.

FIG. 3 is a high-level block diagram illustrating a typical computer 300 for use as a client 104 or the central authority 130. Illustrated are a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The processor 302 may be any general-purpose processor such as an INTEL x86 compatible-CPU. The storage device 308 is, in one embodiment, a hard disk drive but can also be any other device capable of storing data, such as a writeable compact disk (CD) or DVD, or a solid-state memory device. The memory 306 may be, for example, firmware, read-only memory (ROM), non-volatile random access memory (NVRAM), and/or RAM, and holds instructions and data used by the processor 302. The pointing device 314 may be a mouse, track ball, or other type of pointing device, and is used in combination with the keyboard 310 to input data into the computer 300. The graphics adapter 312 displays images and other information on the display 218. The network adapter 316 couples the computer 300 to the network 302.

As is known in the art, the computer 300 is adapted to execute computer program modules. As used herein, the term "module" refers to computer program logic and/or data for providing the specified functionality. A module can be implemented in hardware, firmware, and/or software. In one embodiment, the modules are stored on the storage device 308, loaded into the memory 306, and executed by the processor 302.

The types of computer systems 300 utilized by the entities of FIG. 1 can vary depending upon the embodiment and the processing power utilized by the entity. For example, a client 104 that is a mobile telephone typically has limited processing power, a small display 318, and might lack a pointing device 314. A computer system 300 used as the central server 130 might have greater processing power and lack a display 318 or a keyboard 310.

Figure 4:
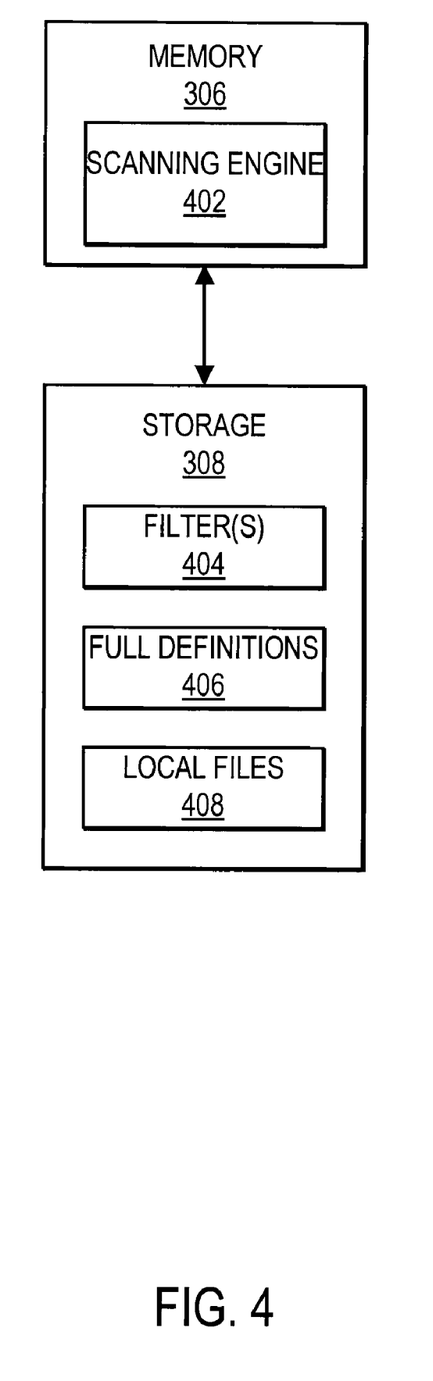
FIG. 4 is a block diagram of memory and storage components of a client device according to one embodiment.

FIG. 4 illustrates an example embodiment of the memory 306 and storage 308 of a client device 104. The memory 306 includes a scanning engine 402 for scanning local files 408 stored in storage 308. Although illustrated in the memory 306, the scanning engine 402 may be stored in the storage 308 and loaded into the memory 306 when executed. The storage 308 also stores one or more filters 404 and a set of full definitions 406 used by the scanning engine 402 to scan the local files 408. In one embodiment, the filter(s) 404 is based on all of the known malware, while full definitions 406 are stored for only a subset (e.g., the most common 30%) of the known malware.

Figure 5:
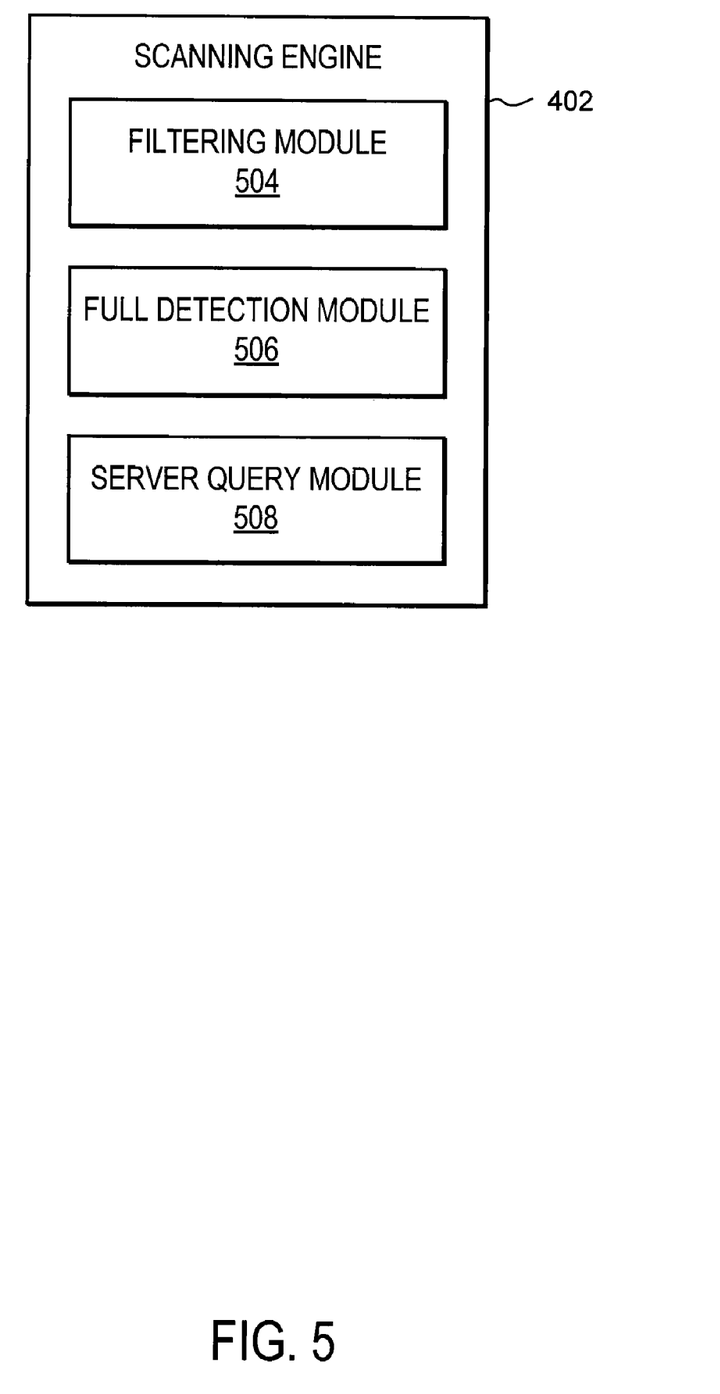
FIG. 5 is a block diagram of a scanning engine according to one embodiment.

FIG. 5 illustrates an example embodiment of the scanning engine 402. The scanning engine 402 includes a filtering module 504, a full detection module 506, and a server query module 508. The filtering module 504 applies the one or more stored filters 404 to the local files 408 during the scanning process. Applying a filter 404 comprises computing a hash of the file 408 that results in either a positive detection or a negative detection. If a positive detection results, the full detection module 506 scans the positively detected file 408 using the full definition 406. Full definitions 406 may be available locally in storage 308 or may be retrieved from the central server 130. The server query module 508 communicates with the central server 130 via the network 102 to request a full definition from the server 130 when it is not found locally. The full detection module 406 then applies the definition 406 to determine if the malicious software has indeed been detected or if the filter 404 has produced a false positive.

Figure 6:
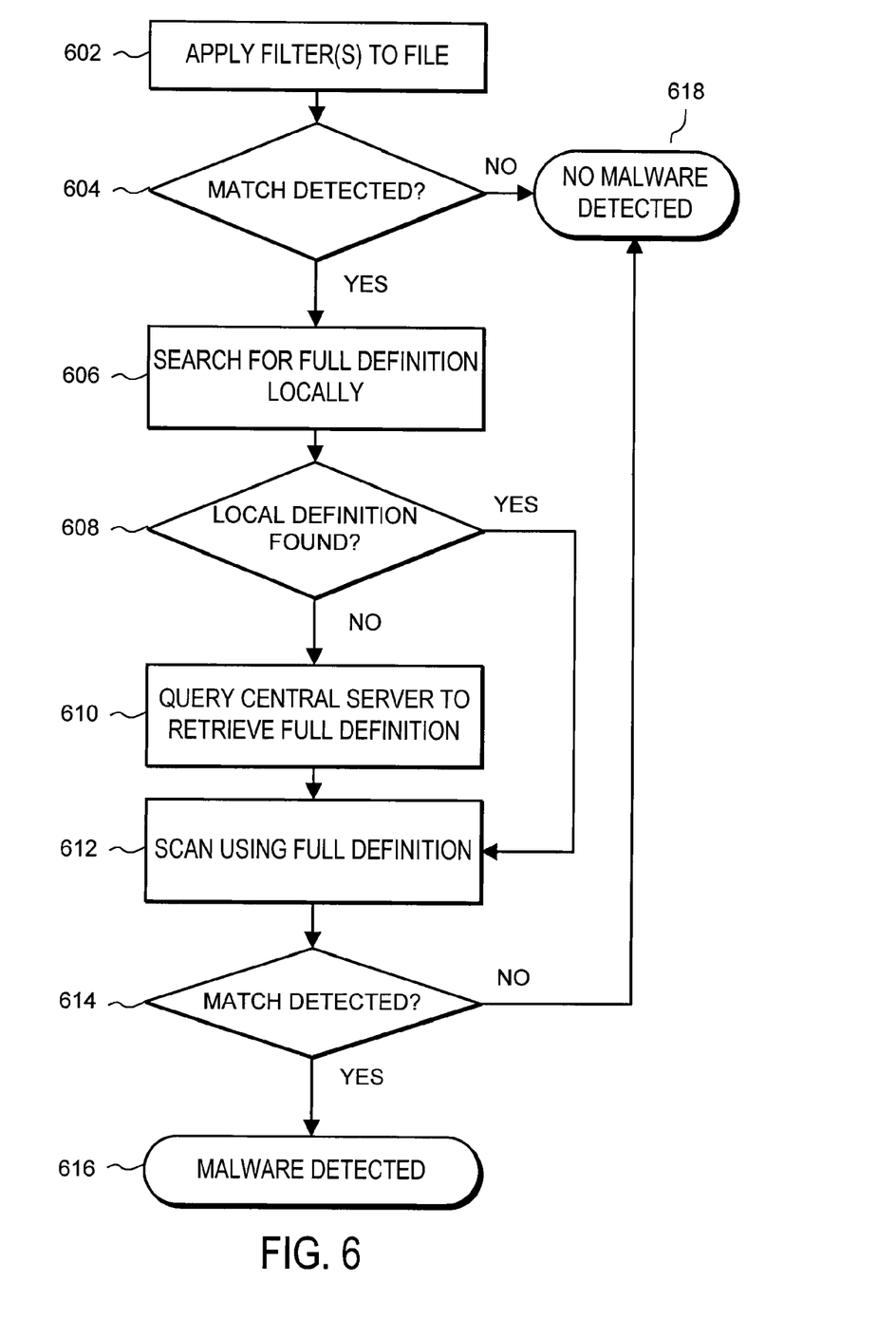
FIG. 6 is a flowchart illustrating a process for detecting malicious software according to one embodiment.

FIG. 6 illustrates an embodiment of a process executed by the scanning engine 402 for detecting malware. The filtering module 504 of the scanning engine 402 first applies 602 the filter 404 to the file 408 to be scanned and determines 604 if a positive detection results. If there is no positive detection, the scanning engine 402 determines that the file is not malware 618. Note that this determination can be made with certainty because the filter 404 is designed to eliminate the possibility of false negatives. If the filtering module 504 produces a positive detection, the scanning engine 402 searches the definitions 306 in the local storage 308 for a full definition of the malware to determine 608 if the definition is stored locally. If the definition is not found locally, the server query module 508 queries 610 the central server 130 for the full definition. If the definition is already stored locally, the querying step 610 is skipped. The full detection module 506 then compares 612 the file to the full definition to determine 614 if there is a match. If a match is not detected, no malware is found (i.e. the filter result was a false positive). If the full definition is found, then the scanning engine 402 determines 616 that malware is detected. Once malware is detected, the scanning engine 402 can provide a threat report to the user of the client device indicating the detected malware. Furthermore, the scanning engine 402 may use any number of conventional techniques to neutralize or remove the malware.

In one embodiment, when a false positive is detected, the filter(s) can be modified to reduce the likelihood of the false positive reoccurring in future applications of the filter. For example, the scanning engine 402 may send a report to the central server 130 identifying the file that generated the false positive. The false positive can be analyzed and a new filter may be generated based on the analysis. Alternatively, the server 130 may provide metadata to the client 104 that instructs the client to ignore a similar detection in future applications of the filter.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for spam detection and analysis through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the scope of the embodiments as defined in the appended claims.

The invention claimed is:

1. A computer-implemented method for detecting malware, comprising:
    locally storing on a client device, a filter based on a set of known malware definitions, and locally storing on the client device a subset of known malware definitions from the set of known malware definitions, the subset selected based on a determined likelihood of malware corresponding to the known malware definitions being detected on the client device;
    applying the filter to an input file to detect if the input file has characteristics matching those of a malware definition in the set of known malware definitions;
    responsive to the input file having characteristics matching those of the malware definition based on applying the filter, determining if the malware definition is stored locally in the subset of known malware definitions;
    responsive to the input file having characteristics matching those of the malware definition and the malware definition not being stored locally, obtaining the malware definition from a central server;
    scanning the input file using the obtained malware definition;
    determining if the input file comprises malware based on the scanning; and
    responsive to the input file not comprising the malware based on the scanning, sending a report to the central server identifying the input file; and
    receiving from the central server in response to the report, a modified filter to reduce a likelihood of a false positive occurring in a future application of the filter if the input file is determined not to comprise the malware based on the scanning.

2. The method of claim 1, wherein the malware definition comprises a characteristic byte pattern known to be present in the malware and wherein scanning the input file comprises determining whether the characteristic byte pattern is present in the input file.

3. The method of claim 1, further comprising:
    receiving from the central server, the subset of known malware definitions from the set of known malware definitions; and
    receiving the filter from the central server.

4. The method of claim 1, further comprising:
    receiving an update from the central server comprising an updated filter generated based on an updated set of known malware.

5. The method of claim 1, wherein the filter comprises a Bloom filter adapted to compute hash functions on the input file, wherein the output of the hash functions indicate if the input file has characteristics matching any of the set of known malware definitions.

6. The method of claim 5, wherein applying the Bloom filter to the input file can produce a false positive detection of malware but cannot produce a false negative detection.

7. The method of claim 1, wherein the filter is generated according to steps comprising:
    computing hash functions on each malware definition; and
    defining the filter based on the outputs of the hash functions.

8. The method of claim 1, wherein the subset of known malware definition comprises malware definitions most likely to be detected on the client device.

9. A computer program product for detecting malware, the computer program product comprising a non-transitory computer-readable storage medium containing computer program code for:
    locally storing on a client device, a filter based on a set of known malware definitions, and locally storing on the client device a subset of known malware definitions from the set of known malware definitions, the subset selected based on a determined likelihood of malware corresponding to the known malware definitions being detected on the client device;
    applying the filter to an input file to detect if the input file has characteristics matching those of a malware definition in the set of known malware definitions;
    responsive to the input file having characteristics matching those of the malware definition based on applying the filter, determining if the malware definition is stored locally in the subset of known malware definitions;
    responsive to the input file having characteristics matching those of the malware definition and the malware definition not being stored locally, obtaining the malware definition from a central server;
    scanning the input file using the obtained malware definition;
    determining if the input file comprises malware based on the scanning;
    responsive to the input file not comprising the malware based on the scanning, sending a report to the central server identifying the input file; and
    receiving from the central server in response to the report, a modified filter to reduce a likelihood of a false positive occurring in a future application of the filter if the input file is determined not to comprise the malware based on the scanning.

10. The computer program product of claim 9, wherein the malware definition comprises a characteristic byte pattern known to be present in the malware and wherein scanning the input file comprises determining whether the characteristic byte pattern is present in the input file.

11. The computer program product of claim 9, wherein the computer-readable storage medium further contains computer program code for:
receiving from the central server, the subset of known malware definitions from the set of known malware definitions; and
receiving the filter from the central server.

12. The computer program product of claim 9, wherein the computer-readable storage medium further contains computer program code for:
receiving an update from the central server comprising an updated filter generated based on an updated set of known malware.

13. The computer program product of claim 9, wherein the filter comprises a Bloom filter adapted to compute hash functions on the input file, wherein the output of the hash functions indicate if the input file has characteristics matching any of the set of known malware definitions.

14. The computer program product of claim 13, wherein applying the Bloom filter to the input file can produce a false positive detection of malware but cannot produce a false negative detection.

15. The computer program product of claim 9, wherein the filter is generated according to steps comprising:
computing hash functions on each malware definition; and
defining the filter based on the outputs of the hash functions.

16. The non-transitory computer-readable storage medium of claim 9, wherein the subset of known malware definition comprises malware definitions most likely to be detected on the client device.

17. A method for distributing malware definitions to a client device, comprising:
generating a filter from a set of known malware definitions, wherein the filter detects if an input file has characteristics matching those of the set of known malware definitions;
distributing the filter to the client device;
selecting a subset of malware definitions from the set of known malware definitions used to generate the filter distributed to the client device, wherein the subset of malware comprises fewer than all of the set of known malware definitions, and wherein the subset is selected based on a determined likelihood of malware corresponding to the known malware definitions being detected on the client device;
distributing by a server, the selected subset of malware definitions to the client device together with the filter;
receiving a query from the client device for a malware definition which is not found in the subset of known malware definitions distributed to the client upon applying the filter to an input file by the client device; and
responsive to the query, transmitting the queried malware definition to the client device to be used in scanning of the input file;
receiving a report from the client device indicating that the queried malware definition is not present in the input file;
responsive to the receiving the report, modifying the filter to reduce a likelihood of a false positive occurring in a future application of the filter; and
transmitting the modified filter to the client device.

18. The method of claim 17, further comprising:
updating the subset of known malware definitions to distribute to the client device based on a frequency of queries for malware definitions from the client device.

19. The method of claim 17, wherein the filter comprises a Bloom filter adapted to compute hash functions on the input file, wherein the output of the hash functions indicate if the input file has characteristics matching any of the set of known malware definitions.

20. The method of claim 17, wherein the subset of malware definition comprises malware definitions most likely to be detected on the client device.

* * * * *